United States Patent [19]

Orzechowski

[11] Patent Number: 5,156,680
[45] Date of Patent: Oct. 20, 1992

[54] FLOW RESTRICTOR FOR A FLUID

[75] Inventor: Thomas W. Orzechowski, Cicero, Ill.

[73] Assignee: Rockwell International Corporation, El Segundo, Calif.

[21] Appl. No.: 738,012

[22] Filed: Jul. 30, 1991

[51] Int. Cl.[5] .............................................. F15D 1/02
[52] U.S. Cl. ...................... 118/46; 118/313; 138/42
[58] Field of Search ............ 118/46, 313; 138/42; 239/93, 533.1, 542

[56] References Cited

U.S. PATENT DOCUMENTS

| | | | |
|---|---|---|---|
| 279,595 | 6/1883 | Pugh | 138/42 |
| 538,006 | 4/1895 | Wynell | |
| 1,915,867 | 6/1933 | Penick | |
| 2,400,161 | 5/1946 | Mockridge et al. | |
| 3,586,104 | 6/1971 | Hyde | 166/142 |
| 3,593,964 | 7/1971 | Morane | 259/4 |
| 3,692,064 | 9/1972 | Hohnerlein | 138/42 |
| 3,729,142 | 4/1973 | Rangel-Garza et al. | 239/542 |
| 3,897,009 | 7/1975 | Rangel-Garza et al. | 239/542 |
| 4,022,384 | 5/1977 | Hoyle et al. | 239/542 |
| 4,043,360 | 8/1977 | Yaron | 138/42 |
| 4,418,723 | 12/1983 | Koni | 138/42 |
| 4,466,462 | 8/1984 | Morris | 138/42 |
| 4,591,274 | 5/1986 | Sullin | 366/366 |
| 4,913,051 | 4/1990 | Molinatto | 29/113.2 |

*Primary Examiner*—W. Gary Jones
*Assistant Examiner*—Charles K. Friedman
*Attorney, Agent, or Firm*—C. B. Patti; V. L. Sewell; H. F. Hamann

[57] ABSTRACT

A flow restrictor (12) for a fluid comprising, an elongated conduit (26) having a lumen (28), and a restriction member (32) snugly received in the lumen (28) of the conduit (26), and having a pair of opposed ends (38) and (40), an entry port (33) adjacent one end (38) of the restriction member (32), and an exit port (35) adjacent the other end (40) of the restriction member (32), and a device (42a–j) and (46a–i) defining a tortuous path (48) between the entry port (33) and exit port (35) to restrict passage of fluid therethrough.

11 Claims, 5 Drawing Sheets

FLOW RESTRICTOR FOR A FLUID

BACKGROUND OF THE INVENTION

The present invention relates to flow restrictors for a fluid.

In the past, conduits have been utilized for many types of machines, such as printing presses, and the conduits have a lumen for freely passing fluid in the devices However, sometimes it may be desirable to restrict the flow of liquid in the conduit in order to increase the pressure in the conduit. In certain environments the liquid may have particulate matter, and if a simple flow restrictor in the form of a disc having a small opening is positioned in the lumen, it may become clogged with the particulate matter soon after its initial use, thus blocking passage of fluid through the conduit. Also, if a conduit is used having a relatively small inside diameter, this conduit may also become stopped by the particles in the fluid. Hence, it is desirable to restrict the flow of liquid in a conduit without clogging in spite of particulate matter in the fluid.

SUMMARY OF THE INVENTION

A principal feature of the present invention is the provision of an improved flow restrictor for a fluid.

The flow restrictor of the present invention comprises, an elongated conduit having a lumen, and a restriction member snugly received in the lumen of the conduit.

A feature of the present invention is that the restriction member has an entry port adjacent one end of the restriction member, and an exit port adjacent the other end of the restriction member.

Another feature of the invention is that the restriction member defines a tortuous path between the entry port and exit port.

Thus, a feature of the present invention is that the tortuous path of the restriction member restricts passage of fluid through the conduit.

Yet another feature of the invention is that the conduit is constructed from an elastic material and has an inner diameter such that it snugly engages the restriction member in the lumen of the conduit.

Still another feature of the invention is that the inner surface of the conduit defines an outer surface of the restriction member for the tortuous path in the restriction member.

Yet another feature of the invention is that the restriction member may have a plurality of lateral annular grooves connected on opposed sides with longitudinal grooves between the lateral grooves.

Still another feature of the invention is that the longitudinal grooves may be staggered on opposed sides of the restriction member while communicating between adjacent lateral grooves.

Yet another feature of the invention is that a pair of lateral grooves adjacent the entry port and exit port has longitudinal grooves communicating between adjacent lateral grooves on an opposed side of the restriction member relative to the ports.

Another feature of the invention is that the lateral grooves and longitudinal grooves impede passage of fluid through the restriction member.

Thus, a feature of the present invention is that the restriction member restricts the flow of fluid through the conduit.

Yet another feature of the invention is that the restriction member is of simplified construction and reduced cost.

A further feature of the invention is that the restriction member may be easily placed in the conduit.

Another feature of the invention is that the restriction member may be utilized to restrict the flow of fluid from the manifold of a printing press in order to increase the pressure in the manifold for proper distribution to a plurality of nozzles communicating with the manifold.

Further features will become more fully apparent in the following description of the embodiments of this invention, and from the appended claims

DESCRIPTION OF THE PREFERRED EMBODIMENTS

Figure 1:
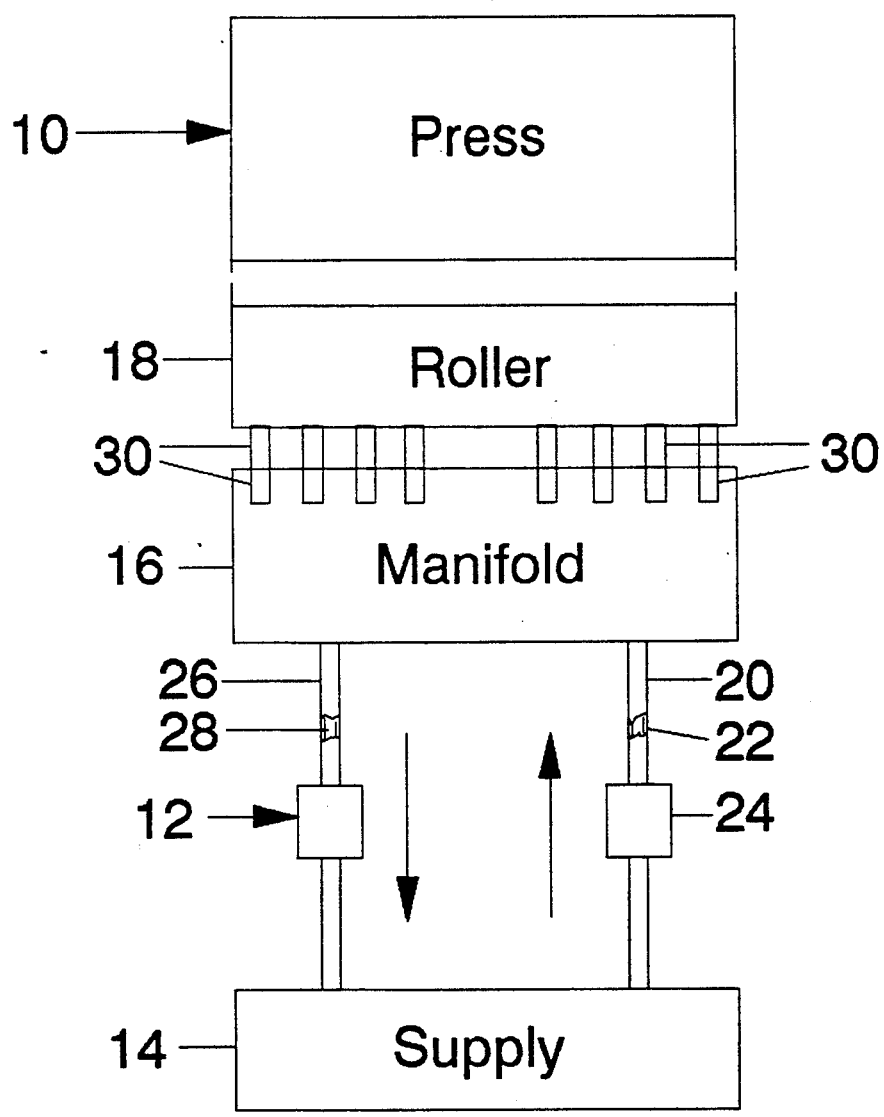
FIG. 1 is a block diagram of a printing press having a flow restrictor of the present invention.
Figure 2:
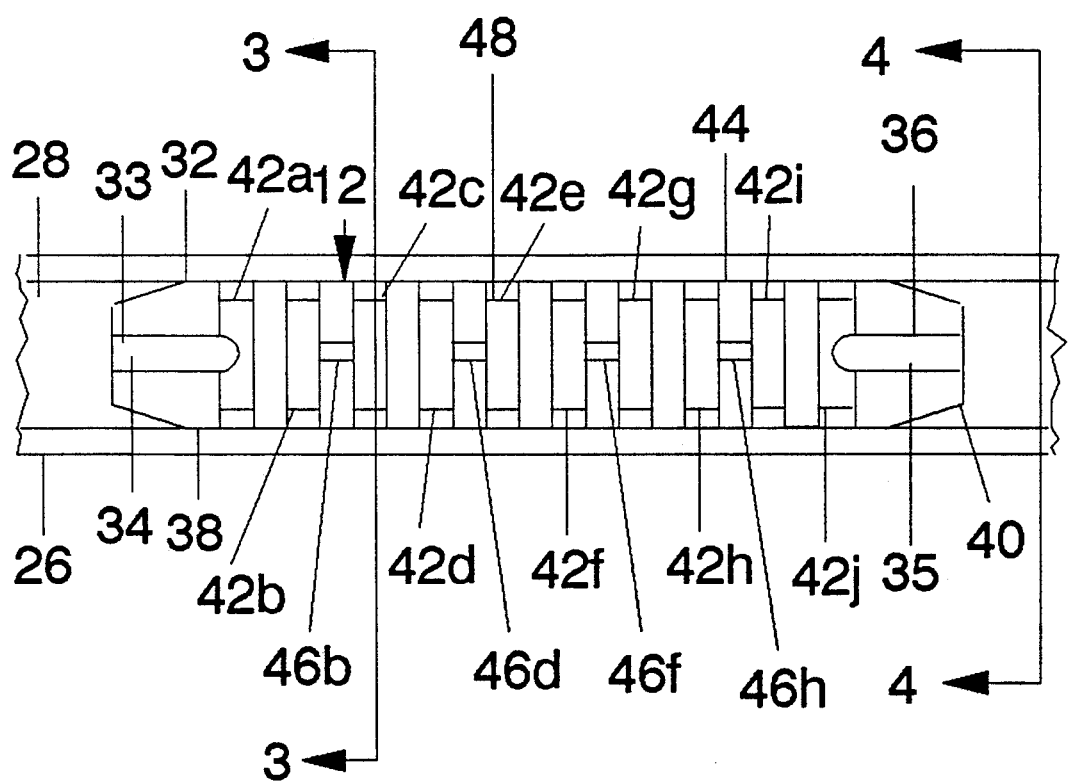
FIG. 2 is a fragmentary elevational view, taken partly in section, of a restriction member inside a conduit of the present invention.
Figure 3:
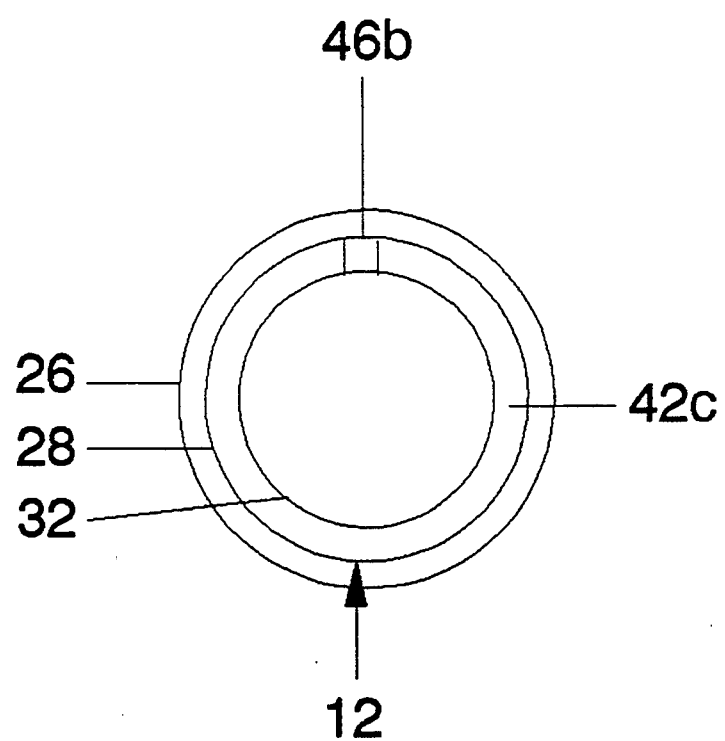
FIG. 3 is a sectional view taken substantially as indicated along the line 3—3 of FIG. 2.
Figure 4:
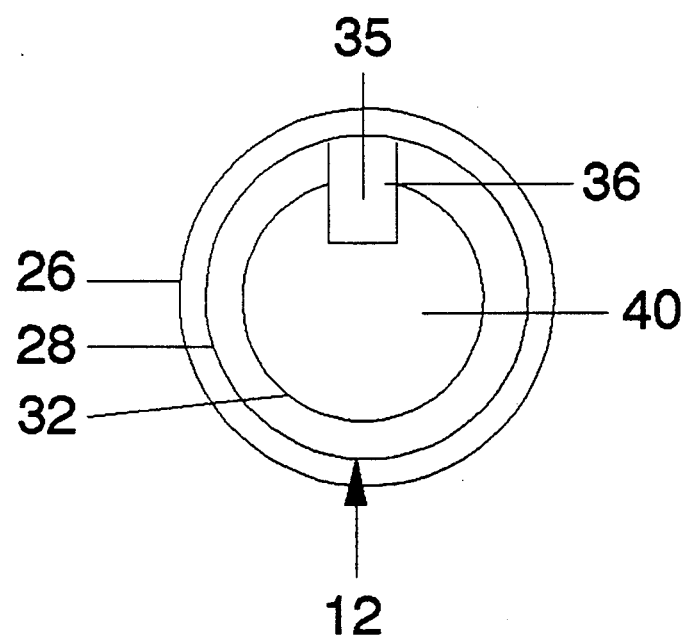
FIG. 4 is a sectional view taken substantially as indicated along the line 4—4 of FIG. 2.

Referring now to FIG. 1, there is shown a printing press generally designated 10 having a flow restrictor 12 for restricting the flow of fluid, and particularly the flow of liquid, such as water or a detergent which may have particulate matter or particles in the liquid.

As shown, the press 10 has a supply 14 of the fluid or liquid, and a hollow manifold 16 adjacent a roller 18 in the press 10. The printing press 10 has a first conduit 20 having a lumen 22 communicating between the supply 14 and manifold 16 for passage of fluid between the supply 14 and manifold 16, with a suitable pump 24 for pumping fluid from the supply 14 through the first conduit 20 into the manifold 16. The printing press 10 also has a second conduit 26 having a lumen 28 for passage of fluid or liquid from the manifold 16 to the supply 14.

As shown, the second conduit 26 has the flow restrictor 12 of the present invention to impede the passage of fluid or liquid through the second conduit 26 in order to maintain a desired pressure in the manifold 16. The manifold 16 has a plurality of nozzles 30 to spray or place the liquid from the manifold 16 onto the roller 18 in a uniform manner in order to dampen the roller 18. The flow restrictor 12 assures a positive pressure in the manifold 16 associated with each of the nozzles 30 in order to obtain a transfer of fluid evenly onto the roller 18 for improved printing in the press 10. The conduit 26 may be constructed from a suitable elastic material, such as rubber.

With reference to FIGS. 2-5, there is shown an elongated restriction member 32 snugly received in the lumen 28 of the second conduit 26, such that the elastic second conduit 26 frictionally engages and encloses the restriction member 32 in the lumen 28. In a preferred form, the restriction member 32 has a generally cylindrical shape.

The restriction member 32 has a pair of cutouts 34 and 36 adjacent a first end 38 of the restriction member 32, with one of the cutouts 34 defining an entry port 33 adjacent the first end 38, and with the other cutout 36 defining an exit port 35 adjacent a second end 40 of the restriction member 32. The restriction member 32 has a plurality of spaced lateral annular grooves 42a, 42b, 42c, 42d, 42e, 42f, 42g, 42h, 42i, and 42j, with the lateral grooves 42a–j being longitudinally spaced along the restriction member 32 between the opposed ends 38 and 40 of the restriction member 32, and with the lateral grooves 42a–j being located in an outer surface 44 of the restriction member 32.

Figure 5:
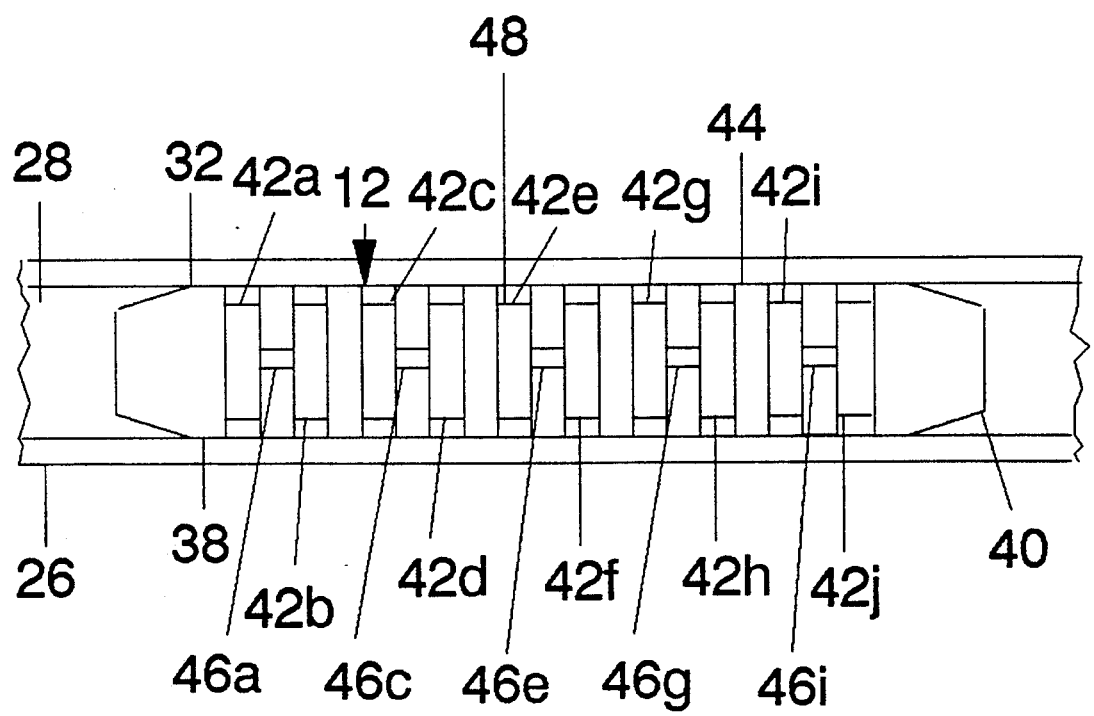
FIG. 5 is a fragmentary elevational view showing an opposed side of the restriction member relative to FIG. 2.

The restriction member 32 also has a plurality of longitudinal grooves 46a, 46b, 46c, 46d, 46e, 46f, 46g, 46h, and 46i, with the longitudinal grooves 46a–i extending between and communicating between the adjacent lateral grooves 42 a–j. As shown, the longitudinal grooves 46a–i are staggered on opposed sides of the restriction member 32 relative to the cutouts 34 and 36. With reference to FIG. 5, the longitudinal groove 46a communicates between the first two lateral grooves 42a and b on an opposed side of the restriction member 32 relative to the cutout 34 adjacent the first end 38 of the restriction member 32 in order to increase the distance of the path 48 from the cutout 34 to the lateral grooves 42a–j and longitudinal grooves 46a–i. Also, the restriction member 32 has a longitudinal groove 46i extending between and communicating between the two last lateral grooves 42k and 42j on an opposed side of the restriction member 32 relative to the cutout 36 in the second end 40 of the restriction member 32. In this manner, the restriction member 32 causes the flow of fluid to an opposed side of the restriction member 32 relative to the cutout 36 to the longitudinal groove 46i. The longitudinal grooves 46a–i are thus staggered on opposed sides of the restriction member 32 between each adjacent lateral grooves 42a–j in the restriction member 32.

In this manner, the lateral grooves 42a–j and longitudinal grooves 46a–i define a tortuous or circuitous path between the first port 33 at the first end 38 of the restriction member 32 to the exit port 35 at the second end 40 of the restriction member 32 inside the second conduit 26 which closes the lateral grooves 42a–j and the longitudinal grooves 46a–i. Thus, the restriction member 32 impedes the passage of liquid or fluid through the lumen 28 of the second conduit 26 in order to maintain a back pressure in the manifold 16 of the press 10 to assure an even distribution of liquid passing from the nozzles 30 onto the roller 18 and to dampen the roller 18 in a uniform and improved manner.

In accordance with the present invention, the flow restrictor 12 for the printing press 10 restricts and impedes the flow of liquid through a second conduit 26 which is downstream from the manifold 16 of the press 10 in order to maintain a uniform positive pressure throughout the manifold 16 and thus cause an even spraying or passage of the liquid from the nozzles 30 onto the roller 18 for use in printing for the press 10.

The foregoing detailed description has been given for clearness of understanding only, and no unnecessary limitations should be understood therefrom, as modifications will be obvious to those skilled in the art.

What is claimed is:

1. A flow restrictor for a fluid comprising:
an elongated conduit having a lumen; and
a restriction member snugly received in the lumen of the conduit, and having a pair of opposed ends, an entry port adjacent one end of the restriction member, an exit port adjacent the other end of the restriction member, and means defining a tortuous path between the entry port and exit port to restrict passage of fluid therethrough, including a manifold having a plurality of nozzles for spraying fluid through the nozzles.

2. The restrictor of claim 1 wherein the conduit and restriction member are received in a printing press.

3. The restrictor of claim 1 wherein said conduct is connected to an exit port of the manifold to maintain pressure in the manifold.

4. The restrictor of claim 1 wherein the conduit is constructed from an elastic material.

5. The restrictor of claim 1 wherein said nozzles spray the fluid on a roller.

6. A flow restrictor for a conduit comprising, an elongated restriction member having a pair of cutouts adjacent opposed ends of the restriction member, a plurality of spaced lateral annular grooves in an outer surface of the restriction member and being spaced between the cutouts in opposed ends of the restriction member, with said cutouts communicating with an end pair of lateral grooves adjacent the cutouts, and a plurality of longitudinal grooves in the outer surface of the restriction member and communicating between adjacent lateral grooves, with a pair of end longitudinal grooves communicating between the end lateral grooves and being positioned on an opposed side of the restriction member relative to the cutouts, and with said longitudinal grooves being staggered on opposed sides of the restriction member to define a tortuous path between the opposed ends of the restriction member.

7. A flow restrictor for a fluid, comprising:
an elongated conduit having a lumen; and
a restriction member snugly received in the lumen of the conduit, and having a pair of opposed ends, an entry port adjacent one end of the restriction member, an exit port adjacent the other end of the restriction member, and means defining a tortuous path between the entry port and exit port to restrict passage of fluid therethrough, including a source of fluid, a hollow manifold having a chamber, a first tubular section communication between the source and the manifold for passage of the fluid from the source to the manifold, and wherein said conduit comprises a second tubular section communicating between the manifold and said source for passage of fluid from the manifold to the source, with said restriction member being snugly received in the second tubular section to impede the passage of fluid from the manifold to the source.

8. A flow restrictor for a fluid, comprising:
an elongated conduit having a lumen; and
a restriction member snugly received in the lumen of the conduit, and having a pair of opposed ends, an entry port adjacent one end of the restriction member, an exit port adjacent the other end of the restriction member, and means defining a tortuous path between the entry port and exit port to restrict passage of fluid therethrough, wherein the restriction member has a generally cylindrical shape having a plurality of spaced lateral annular grooves in an outer surface of the restriction member, and a plurality of longitudinal grooves communicating between said lateral grooves, wherein the longitudinal grooves are staggered on opposed sides of the restriction member and communicate between each of the adjacent lateral grooves.

9. The restriction member of claim 8 wherein the entry port and exit port comprise a pair of cutouts in the opposed ends of the restriction member, with the cutouts communicating with one of the lateral grooves adjacent opposed ends of the restriction member.

10. The restrictor of claim 9 wherein the longitudinal grooves communicate between the first two lateral grooves adjacent the cutouts, and are located on an opposed side of the restriction member relative to the cutouts.

11. The restrictor of claim 10 wherein the conduit closes both the lateral and longitudinal grooves.

* * * * *